United States Patent [19]

Haraguchi

[11] 4,311,376
[45] Jan. 19, 1982

[54] MIRROR OPERATING MECHANISM FOR SINGLE-LENS REFLEX CAMERA

[75] Inventor: Keisuke Haraguchi, Ranzan, Japan

[73] Assignee: Asahi Kogaku Kogyo Kabushiki Kaisha, Tokyo, Japan

[21] Appl. No.: 166,645

[22] Filed: Jul. 7, 1980

[30] Foreign Application Priority Data

Jul. 10, 1979 [JP] Japan ............................ 54/94704[U]

[51] Int. Cl.³ ............................................ G03B 19/12
[52] U.S. Cl. ...................................... 354/153; 354/55
[58] Field of Search ................. 354/152, 153, 156, 55, 354/56

[56] References Cited

U.S. PATENT DOCUMENTS 3,332,331 7/1967 Mandler ................................. 354/55
3,401,614 9/1968 Gunther ................................. 354/55
3,601,027 8/1971 Ono ....................................... 354/55

Primary Examiner—L. T. Hix
Assistant Examiner—Alan Mathews
Attorney, Agent, or Firm—Sughrue, Mion, Zinn, Macpeak & Seas

[57] ABSTRACT

A mirror operating mechanism for use with a single-lens reflex camera including a first mirror holding frame supporting a half-silvered mirror, a second mirror holding frame supporting a totally reflecting mirror and a second mirror operating lever. The first mirror holding frame is pivotally coupled to a mirror box housing through a first shaft while the second mirror holding frame is pivotally coupled to the first mirror holding frame by a second shaft. Further, the second mirror operating mirror is pivotally coupled to the first mirror holding frame by a third shaft and a fourth shaft coupled to the second mirror holding frame is slidably disposed in elongated grooves formed therein. One end of the second mirror operating lever confronts a rotation angle control plate during operation of the mechanism to control the raising of the second mirror holding frame and operating lever.

6 Claims, 4 Drawing Figures

MIRROR OPERATING MECHANISM FOR SINGLE-LENS REFLEX CAMERA

BACKGROUND OF THE INVENTION

The present invention relates to a mirror operating mechanism including a first mirror holding frame provided with a half-silvered mirror which splits light from the camera lens into a reflected portion and a transmitted portion and a second mirror holding frame provided with a totally reflecting mirror which reflects the light portion transmitted through the half-silvered mirror.

It is necessary for a mirror operating mechanism including a half-silvered mirror and a totally reflecting mirror used, for instance, in an automatic focus detecting device, to be reliable so that, during the observation of the object to be photographed through the viewfinder, light beams forming the image of the object to be photographed are simultaneously applied to a viewfinder optical system and to a focus detecting system so as to form the image of the object both on the focus detecting element of the focus detecting system and on the focusing screen of the viewfinder system. During the photographing operation, it is necessary for the mirror operating mechanism to retract the mirrors from the optical path between the photographing lens and the film surface to prevent the occurrence of a vignette effect on the film surface and to optically shield the light transmitting window of the half-silvered mirror when the mirror is lifted thereby to prevent the formation of ghost images attributed to the leakage of light from the viewfinder system and to reflections from the focusing screen. Furthermore, it is required to adjust the angle of the totally reflecting mirror in order to adjust the formation of an image on the focus detecting element.

In view of the foregoing, an object of the present invention is to provide a mirror operating mechanism which is simple in construction and yet which satisfies the above-described requirements.

SUMMARY OF THE INVENTION

This, as well as other objects of the invention, are met by a mirror operating mechanism for use with a single-lens reflex camera including a mirror box housing, a first shaft and a first mirror holding frame in which is positioned a half-silvered mirror which splits light applied thereto from a photographing lens of the camera into a reflected light portion and a transmitted light portion. The first shaft pivotally couples the first mirror holding frame to the mirror box housing. A second mirror holding frame supports a totally reflecting mirror which reflects the transmitted portion of light from the half-silvered mirror. The second mirror holding frame is pivotally mounted to the first mirror holding frame by the second shaft. A rotation angle control plate is coupled to the mirror box housing with the rotation angle control plate having a cam surface the position of which controls the position of the second mirror holding frame. A second mirror operating lever is pivotally coupled to the first mirror holding frame by a third shaft. A fourth shaft is rigidly coupled to the second mirror holding frame with one end of the mirror operating lever being slidably coupled through elongated grooves formed in the second mirror operating lever. The other end of the second mirror operating lever confronts the rotation angle control plate. If desired, the other end of the second mirror operating lever can be provided with a roller device. With this construction, the first mirror holding frame is displaced from an observation position to a photographing position and the second mirror operating lever is turned relative to the first mirror holding frame with the aid of the cam surface of the rotation angle control plate to raise the second mirror holding frame with the aid of the elongated grooves of the second mirror operating lever. As used herein, "shaft" can mean either a single solid shaft or two separate shaft portions having central axes lying along a common straight line.

Preferably with this construction, when the first mirror holding frame is raised to the photographing position, a light transmitting window of the half-silvered mirror is optically shielded by the second mirror holding frame and a part of the light transmitting window close to the second shaft is optically shielded by the second mirror operating lever. In the observation position, the second mirror operating lever is spaced from the rotation angle control plate. In this position, the orientation angle of the totally reflecting mirror may be adjusted by action of the side portions of the elongated grooves of the second mirror operating lever upon the fourth shaft.

DESCRIPTION OF THE PREFERRED EMBODIMENTS

A preferred embodiment of a mirror operating mechanism utilized in a single-lens reflex camera constructed according to the present invention will be described with reference to the accompanying drawings.

Figure 1:
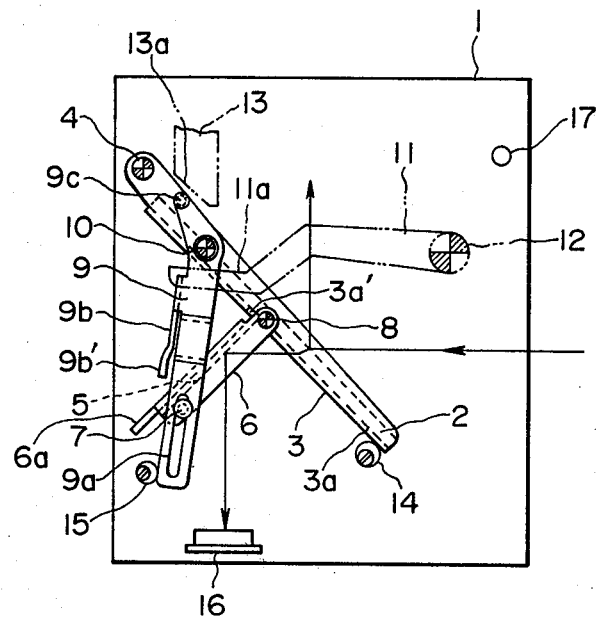
FIG. 1 is a side view showing a preferred embodiment of a mirror operating mechanism of the invention which is in an observation position.

In FIG. 1, reference numeral 1 designates a mirror box housing and 2 a half-silvered mirror, hereinafter referred to as "a first mirror 2" when applicable, which is fixedly secured to a first mirror holding frame 3. The first mirror holding frame 3 is pivotally coupled to the mirror box housing 1 by a shaft 4 which is attached to one end of the holding frame 3. The holding frame 3 is biased clockwise around the shaft 4 by a first mirror restoring spring (not shown). The holding frame 3 is detained by a first mirror angle adjusting pin 14. The first mirror holding mirror 3 is provided with a light transmitting window 3a.

Further in FIG. 1, reference numeral 5 designates a totally reflecting mirror, hereinafter referred to as "a second mirror 5" when applicable, which is fixedly secured to a second mirror holding frame 6. The second mirror holding frame 6 is pivotally coupled to the first mirror holding frame 3 by shafts 8 attached to both sides of the first mirror holding frame 3. A second mirror operating lever 9 is pivotally coupled to the first mirror holding frame 3 around shafts 10 provided on the first mirror holding frame 3. The second mirror operating lever 9 is biased clockwise by a second mirror restoring spring (not shown) whose spring force is weaker than that of the first mirror restoring spring. The second mirror operating lever is detained by a second mirror angle adjusting pin 15. A roller 9c is provided at one end of the second mirror operating lever 9 at a position spaced from a rotation angle control plate 13 which is fixedly secured to the mirror box housing 1 and which has a cam surface 13a. However, the rollers 9c can engage with the rotation angle control plate 13. The other end of the second operating lever 9 is engaged through elongated grooves 9a with shafts 7 provided on both sides of the second mirror holding frame 6. The two sides of the second operating lever 9 are coupled together through a coupling member 9b from which a bent portion 9b' extends. A mirror lifting lever 11, indicated by the dot-chain line, is adapted to be turned clockwise by a mirror driving member (not shown) around a shaft 12 fixedly secured to the mirror box housing 1 until it comes into abutment against the shaft 10 attached to the first mirror holding frame 3. A focus detecting element 16, provided at a position equivalent to the film surface, is secured to the mirror box housing 1. A stop 17 is secured to the mirror box housing 1 for detaining the upward movement of the mirror.

The operation of the mirror operating mechanism thus constructed will now be described.

Figure 2:
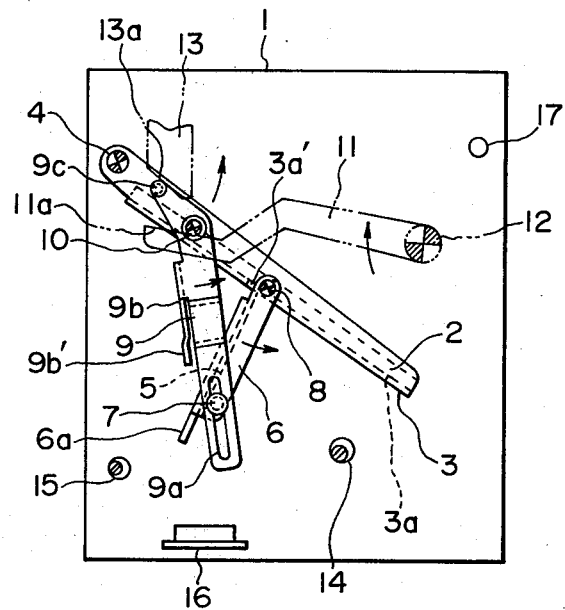
FIG. 2 is a side view showing the mirror operating mechanism at an intermediate position while it is being operated.

When the mirror lifting lever 11 is turned clockwise by the mirror driving member, one end of the mirror lifting lever 11 comes into abutment with the shaft 10 on the first mirror holding frame 3 as a result of which the mirror lifting lever 11 causes the first mirror holding frame 3 to turn counterclockwise around the shaft 4. As the shaft 10 moves together with the first mirror holding frame 3 while acting as a fulcrum, the rollers 9c at the end of the second mirror operating lever 9 come into abutment with the cam surface of the rotation control plate 13 as shown in FIG. 2. As the shaft 10 is moved further, the second mirror operating lever 9 is moved by action of the roller 9c and the cam surface 13a. That is, the second mirror operating lever 9 is turned relative to the first mirror holding frame 3.

Figure 3:
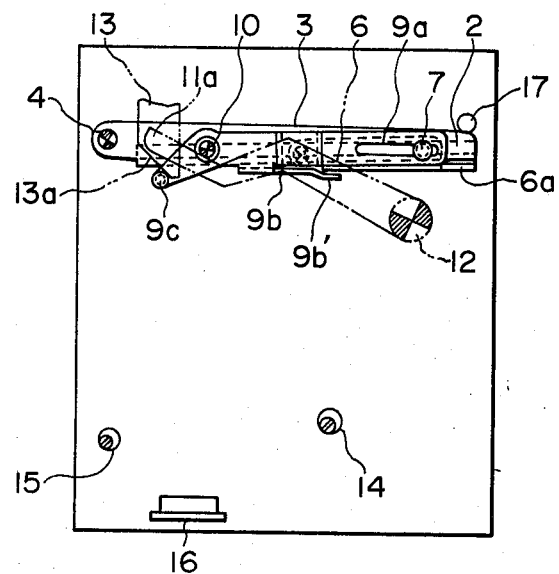
FIG. 3 is a side view showing the mechanism in a photographing position.

On the other hand, as the shafts 8 on the first mirror holding frame 3 move, the shafts 7, which are attached to one end of the second mirror holding frame and are disposed in the elongated grooves 9a of the second mirror operating lever 9, slide along the elongated grooves 9a as a result of which the second mirror holding frame 6 is turned counterclockwise around the shafts 8. When the first mirror holding frame 3 comes into abutment with the stop 17 as shown in FIG. 3, the second mirror holding frame 6 lifting operation is completed. This is, the second mirror holding frame 6 is stopped with the first mirror holding frame 3 biased upwardly by the mirror driving member through the mirror lifting lever 11.

Figure 4:
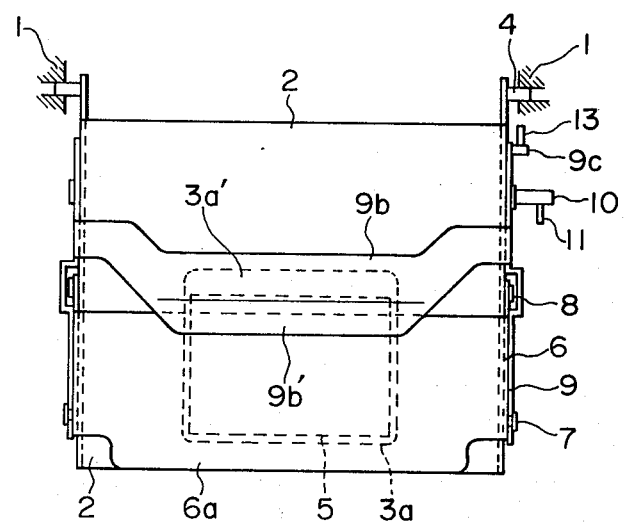
FIG. 4 is a diagram showing a first mirror holding frame 3 as viewed from below a mirror box in FIG. 3 illustrating the optical shielding of a light transmitting window of the holding frame.

The rotation of the second mirror operating lever 9 is limited by the cam surface 13a of the rotation angle control plate 13 so that the second mirror 5 is stopped at a position where it is not in contact with the first mirror holding frame 3. In this operation, the light transmitting window 3a of the first mirror holding frame 3 is optically shielded by the second mirror 5 and the second mirror holding frame 6 while a light transmitting window 3a' which is provided, as seen in FIGS. 1 and 4, close to the shafts 8 of the second mirror holding frame 6 is optically shielded by the coupling member 9b and bent apart 9b' of the second mirror operating lever 9.

Therefore, leakage of light from the viewfinder, which could cause a harmful flare on the photographing plane during a photographing operation, is prevented.

The adjustment of angle of orientation the second mirror 5 while it is in the lowered or observation position as shown in FIG. 1 will now be described. The second mirror operating lever 9 is spring biased by the spring clockwise around the shaft 10 of the first mirror holding frame 3 so that the roller 9c at the end of the lever 9 is spaced apart from the rotation control plate 13 as required with the other end of the lever 9 stopped by the mirror angle adjusting pin 15. Regarding the adjusting pin 15 which is formed as an eccentrically mounted cam, in the observation position, the second mirror operating lever 9 follows the movement of the abutting surface of the adjusting pin 15 as a result of which the second mirror holding frame 6 is turned around the shafts 8 with the aid of the shafts 7 engaged with the elongated grooves 9a to thereby adjust the angle of the second mirror 5. In other words, the first mirror holding frame 3 is fixedly positioned in accordance with the adjusted position of the first mirror 2. Therefore, the angle of the second mirror 5 is adjusted by turning the second mirror holding frame 6 around the shafts 8 attached to the holding frame 3 by adjusting the position of the second mirror operating lever 9 and in response to adjustment of the adjusting pin 15.

As is apparent from the above description, according to the mirror operating mechanism of the invention, the fulcrums for moving the second mirror holding frame 6 and the second mirror operating lever 9 are provided by the shafts attached to the first mirror holding frame 3, the second mirror holding frame 6 is coupled through the elongated grooves to the second mirror operating lever 9, the second mirror operating lever 9 is turned relative to the first mirror with the aid of the rotation angle control plate 13 to raise the second mirror together with the first mirror whereupon the transmitting window of the first mirror is optically shielded by the second mirror and the second mirror operating lever and the angle of the second mirror is adjusted through adjustment of the angle of the second mirror operating lever. Thus, the mirror operating mechanism of the invention has no inoperative components and accordingly is simple in construction. Accordingly, the above-described object of the invention has been achieved by the provision of the mirror operating mechanism which is constructed as described above.

What is claimed is:

1. A mirror operating mechanism in a single-lens reflex camera comprising:
   a mirror box housing;
   a first shaft;
   a first mirror holding frame holding a half-silvered mirror adapted to split light applied thereto from a photographing lens into a reflected portion and a transmitted portion, said first shaft pivotally coupling said first mirror holding frame to said mirror box housing;
   a second shaft;
   a second mirror holding frame holding a totally reflecting mirror for reflecting said transmitted portion from said half-silvered mirror, said second mirror holding frame being pivotally coupled to said first mirror holding frame by said second shaft;
   a rotation angle control plate coupled to said mirror box housing, said rotation angle control plate having a cam surface;

a third shaft;

a second mirror operating lever pivotally coupled to said first mirror holding frame by said third shaft; and a fourth shaft rigidly coupled to said second mirror holding frame, one end of said second mirror operating lever being slidably coupled through elongated grooves formed therein to said fourth shaft and the other end of said second mirror operating lever confronting said rotation angle control plate, wherein, as said first mirror holding frame is displaced from an observation position to a photographing position, said second mirror operating lever is turned relative to said first mirror holding frame with the aid of said cam surface of said rotation angle control plate to raise said second mirror holding frame with the aid of said elongated grooves of said second mirror operating lever.

2. The mirror operating mechanism as claimed in claim 1 wherein when said first mirror holding frame is raised to the photographing position, a light transmitting window of said half-silvered mirror is optically shielded by said second mirror holding frame and a part of said light transmitting window which is close to said second shaft is optically shielded by said second mirror operating lever.

3. The mirror operating mechanism as claimed in claim 1 wherein said second mirror operating lever is spaced from said rotation angle control plate in the observation position and the angle of said totally reflecting mirror is adjusted by action of side portions of said elongated grooves of said second mirror operating lever upon said fourth shaft by adjusting the angular position of said second mirror operating lever.

4. The mirror operating mechanism as claimed in claim 1 wherein said other end of said mirror operating lever is provided with roller means.

5. The mirror operating mechanism as claimed in claim 1 further comprising an adjusting pin for adjusting the angular orientation of said second mirror operating lever.

6. The mirror operating mechanism as claimed in claim 1 further comprising an adjusting pin for adjusting the angular orientation of said first mirror holding frame.

* * * * *